INVENTORS
CHARLES W. E. WALKER

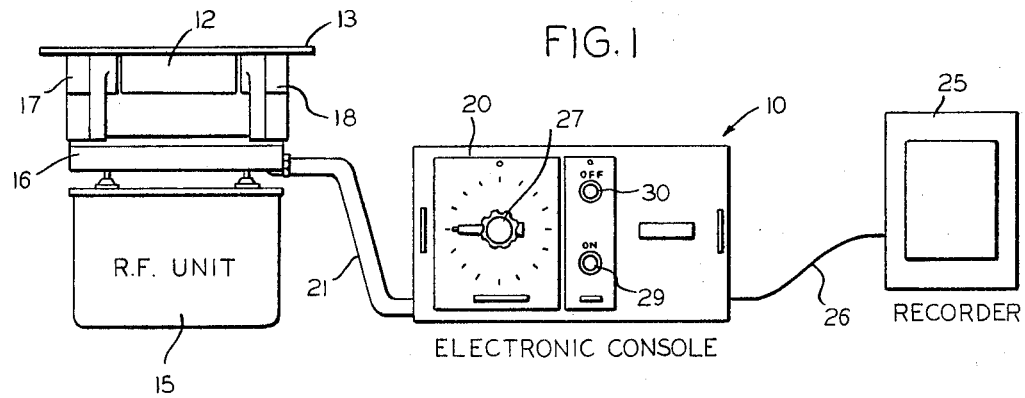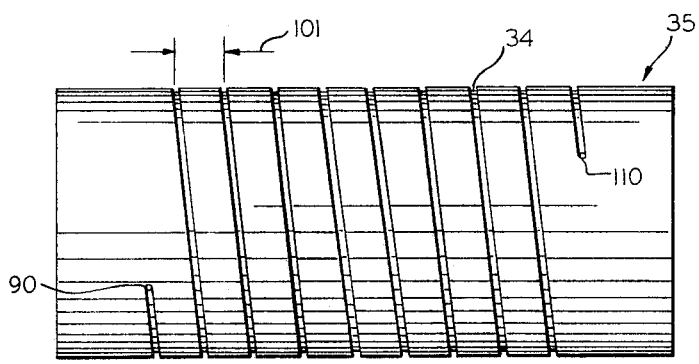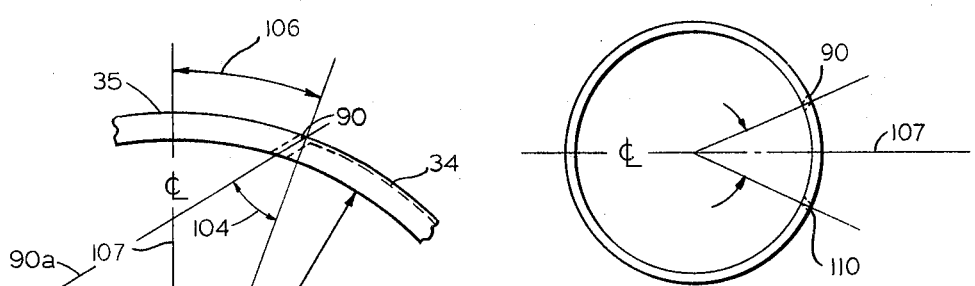

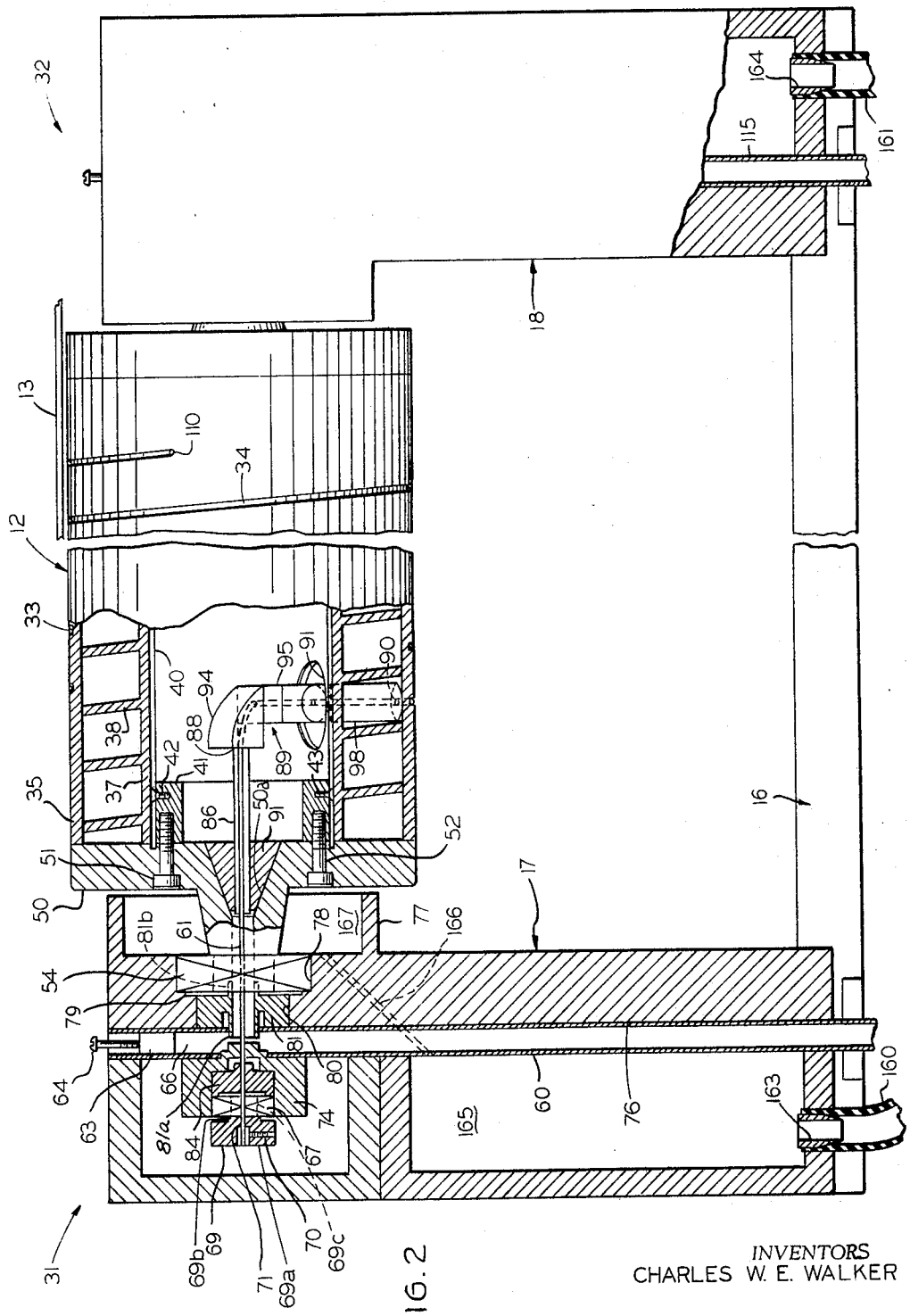

ATTORNEYS

INVENTOR.
CHARLES W. E. WALKER

BY
ATTORNEYS

INVENTORS
CHARLES W. E. WALKER

3,509,452
MICROWAVE HYGROMETER HAVING A HELICAL SURFACE WAVE TRANSMISSION LINE

Charles W. E. Walker, San Mateo, Calif., assignor to Beloit Corporation, Beloit, Wis., a corporation of Wisconsin
Continuation-in-part of application Ser. No. 260,743, Feb. 25, 1963. This application May 21, 1965, Ser. No. 457,682
Int. Cl. G01r 27/04; H03f 1/36; H01p 3/12
U.S. Cl. 324—58.5     12 Claims

ABSTRACT OF THE DISCLOSURE

A testing apparatus for sensing moisture in material which comprises a coiled stripline test element that is placed in close proximity to a specimen to be tested and to which microwave energy is fed, is disclosed. The microwave energy is absorbed by the test specimen as a function of the square of the water content and the amount of energy absorbed is detected and supplied to an indicator to indicate the moisture in the sample.

---

This application is a continuation-in-part of my copending application U.S. Ser. No. 260,743, filed Feb. 25, 1963, now Patent No. 3,255,408, which is in turn a continuation-in-part of application Ser. No. 753,987, filed Aug. 8, 1958, and application Ser. No. 84,657, filed Jan. 24, 1961 (now U.S. Patent No. 3,079,552, which issued on Feb. 26, 1963), said application Ser. No. 84,657 being referred to under 35 USC 120 at column 1, line 11 of my Patent No. 3,255,408.

This invention relates generally to a microwave apparatus and more particularly to a single conductor surface wave transmission device and to a method of sensing and determining constituents of a particular material. One particular application of the present invention is that of sensing and determining moisture content in a traveling paper web.

Microwave energy can be transmitted as a surface wave along a transmission line which is formed into a loop or a coil. The length of each loop or of the multiple loops of a surface wave transmission line is preferably such that the microwave energy which travels about the loop and returns to a point at or adjacent the entrance point of the loop will have a predetermined phase relationship to the microwave energy entering the loop. For example, the length of the loop may be a whole number multiple of the wavelengths of microwave energy so as to combine and reinforce the microwave energy entering the loop. Such a surface wave loop device can, therefore, fulfill the same function as a cavity resonator and can be applied in the design of a magnetron or klystron-like oscillator.

Such loop devices have a wide range of application and are particularly suitable for use in measuring the moisture content of a paper web. Although devices of this class have had recognition in the prior art, many of such devices are practical only under laboratory conditions. When such prior known devices are employed in the field, therefore, many inadequacies become readily apparent.

It is, therefore, an object of the present invention to provide a novel and improved method and means for determining the amount of a constituent such as moisture associated with a particular solid or fluid material.

Another object of the present invention is to provide a surface wave device having a sensing head cooperating with a minimum frictional effect with a moving material to determine a constituent therein.

Still another object of the present invention is to provide an instrument for measuring moisture content and the like having a novel and improved coil-type sensing head.

And another object of the present invention is to provide a surface wave device having a sensing head which effectively couples microwave energy to a material under test.

Yet another object of the instant invention is to provide novel means for guiding microwave energy along a curved surface of a radiating element in the form of a transmission line.

A further object of the present invention is to provide a sensing head and a radiating conductor formed thereon, each having the same coefficient of thermo-expansion.

Still another object of the present invention is to provide a sensing head in the form of a coil which has a minimum amount of microwave interaction between the coils thereof and which thereby functions basically as a straight line conductor.

A still further object of this invention is to provide a zero reading mechanism for making periodic corrections in the system.

Yet another object of the present invention is to provide an improved means for computating the information obtained by the measuring instrument.

Another object of the present invention is to provide means for cooling and maintaining free of dust and other foreign particles the several components of the system.

Still another object of the present invention is to provide a sensing head having a novel configuration for maintaining the sensing characteristics thereof constant under varying temperature conditions.

And another object of the instant invention is to provide novel means of supporting the sensing head for low microwave loss and for providing a minimum of obstruction to the microwave signal.

These and other objects of the present invention will become more fully realized and understood from the following detailed description when taken in conjunction with the accompanying drawings, wherein like reference numerals are intended to designate the same or similar structures and wherein:

FIGURE 1 is a diagrammatic view of the sensing system of the present invention;

FIGURE 2 is a side elevational view of one preferred embodiment of the sensing head and mounting therefor of the present invention with certain parts shown broken away;

FIGURE 3 is a detailed view of a sensing head illustrated in FIGURES 1 and 2;

FIGURE 4 is a partial detailed view taken from one side of the sensing head illustrated in FIGURE 3;

FIGURE 5 is a side view of the sensing head illustrated in FIGURE 3;

Figure 6:
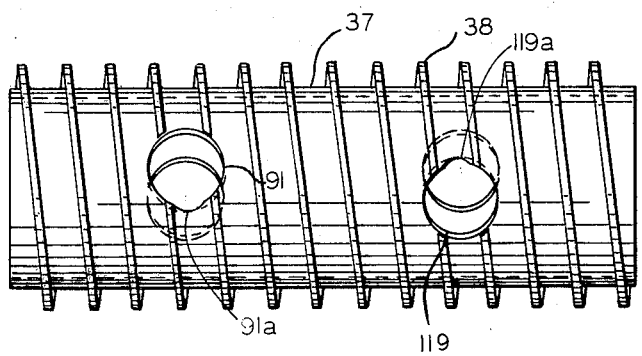
FIGURE 6 is a detailed view of the spiral ribbed spacer used in the construction and support of the sensing head of FIGURE 2.

FIGURE 1 illustrates a sensing system 10 for measuring a constituent, such as moisture, of a particular material. Engaged with a sensing head 12 is a moving paper web 13 of which the moisture content is to be determined. Microwave energy from a radio frequency unit 15 is supplied to the sensing head 12 through a base member 16 and a wave guide in an end support member 17. The microwave energy travels a predetermined path about the sensing head 12 and enters a second wave guide in a support member 18 and therefrom to a receiving sensing element in the R.F. unit 15.

Control of the R.F. unit 15 is obtained by an electronic control console 20 which is connected thereto through a multi-conductor cable 21. A continuous record of the operation of the sensing head 12 and the R.F. unit 15 can be obtained by a recorder 25, which is connected thereto through the electronic control console 20 by a conductor 26.

During the operation of the constituent sensing system 10, corrections to obtain optimum operation can be obtained by an adjusting knob 27 located on the electronic control console 20. Also located on the electronic console 20 are on and off push button type switches 29 and 30.

As mentioned in my copending application, Ser. No. 260,743, filed Feb. 25, 1963, the sensing head 12 is disposed for traversing the paper web 13 to sense the entire width thereof. Because of the characteristics of microwave transmission, it is necessary to maintain the wave guides which are provided in the support members 17, 18 as short as possible, and, therefore, the sensing head 12 is mounted directly on the R.F. unit 15 and both are moved with respect to the web 13.

Referring to FIGURE 2, a launching end 31 of the sensing head 12 is similar to a receiving end 32 thereof, and, therefore, only the launching end 31 will be described in detail hereinbelow.

In the illustrated embodiment of FIGURE 2, a surface wave transmission line is provided by means of a conductor 33 deposited in a helical groove 34 of a thin walled dielectric tube 35. The conductor 33 is shown therein in section to better illustrate the relationship thereof with the groove 34. The conductor 33 is chemically deposited in the groove 34 in the form of a helical coil about the dielectric tube 35 by the Shipley process, and a silver is electro-chemically deposited on the copper. In this manner, the diametric surface of the conductor 33 is made flush with the surface of the dielectric tube 35, so that a contact may be made with the moving paper web 13.

The sensing head 12 includes a spacer 37 having a spiral rib 38 thereon extending the entire length of the sensing head 12. The ribbed spacer 37 is located within the dielectric tube 35 in such a manner as to locate the groove 34 of the tube 35 between successive portions of the spiral rib 38. It can be readily appreciated that the spacer 37 with the rib 38 thereon provides a support for the thin walled dielectric tube 35. Furthermore, in microwave techniques, it is in some cases desirable to isolate the respective loops of a microwave coil from one another. This can be accomplished principally by spacing the turns appreciably more than a wavelength apart but isolation can be aided particularly on the side of the conductor within the helix by means of the supporting ribs of the spacer 37. If, for example, the turns are spaced one inch apart, two ribs can be interposed between each turn so that the space between them, where interaction between the respective fields of the two successive turns would otherwise take place, will be almost free of field. The spiral ribbed spacer 37 preferably has substantially the same coefficient of thermo-expansion as that of the dielectric tube 35 and may, if desired, be of the same dielectric material.

The sensing head 12 also includes an inner cylinder 40 which is preferably aluminum. The inner cylinder 40 has secured thereto an end ring 41 by means of screws 42 and 43. The end ring 41 is also preferably aluminum. A microwave radiating element or horn 50 is secured to the end of the sensing head 12. The horn 50 is axially aligned and fixedly secured to the sensing head 12 by means of screws 51 and 52. The horn 50 is mounted at the upper portion of the support arm 17 and journalled therein by a bearing 54.

Microwave energy from the R.F. unit 15, FIGURE 1, is coupled to a rectangular wave guide 60 for coupling the microwave energy to a conductor 61 which is connected to the conductor portion 33 of the sensing head 12. The wave guide 60 is provided with a tuning member 63, which is adjustably movable by means of a screw 64. The tuning member 63 is also referred to as a short circuit member in that it provides a resonate or short circuit chamber 66 from the microwave energy is coupled at right angles to the conductor 61.

The tuning member 63 may be retained in its adjusted position by means of frictional engagement with the inner walls of the wave guide 60, or any suitable means may be provided for adjustably fixing the position of the wave guide tuning member 63. The conductor 61 rotates with the sensing head 12 through the axes of the horn 50 and is provided with a suitable bearing 67. A retaining member 69 is secured to the conductor 61 by means of a set screw 70 and may have a reduced diameter portion on which the bearing 67 acts.

Since in the microwave techniques, dimensions of the various components are extremely critical, and since it is desired to provide a teaching of the present invention adequate for one skilled in the art to practice such an invention, the dimensions of various components of the present invention will be provided hereinbelow. However, it is to be understood that these dimensions are intended only for teaching one preferred embodiment of the present invention and are not intended to be limiting to the scope thereof.

The drawings are not necessarily to scale or in accord with the dimensions given hereinbelow. It is to be understood that the drawings are diagrammatic essentially and out of proportion with respect to some dimensions so as to better illustrate the present invention with sufficient clarity. The dimensions given herein are those which are presently employed on an existing operative device. It is to be understood, however, that changes may be made in many of these dimensions without departing from the spirit of the invention and scope of the appended claims.

Specifically, a head portion 69a of the retainer member 69 may have a diameter of ½ inch and an axial width of 3/16 of an inch. Immediately adjacent the head portion thereof is a shoulder portion 69b having a diameter of ¼ inch and axial extent of approximately .03 inch. Beyond the shoulder portion is an axially projecting bearing portion 69c disposed within the bearing 67 and having an outer diameter of approximately .1876 inch and an axial extent of approximately .156 inch. The overall axial dimension of the retaining member 69 is thus ⅜ inch. The member 69 has a central bore 71 of .063 inch diameter extending therethrough for receiving the conductor 61 therein. The conductor 61 has a diameter of 1/16 inch and is held firmly within the bore 71. The retaining member 69 may also be of aluminum.

The outer race of the bearing 67 is secured in a rotary joint member 74, which has an outer diameter of 1.250 inches for an axial extent of approximately .45 inch, a first reduced portion at one end thereof having an outer diameter of .374 inch and an axial extent of .05 inch and a further reduced portion having an outer diameter of .260 inch and an axial extent of .085 inch. The right hand end of the rotary joint member 74 as viewed in FIGURE 2 has a bore therein of .080 inch for an axial extent of .110 inch for loose fitting of the conductor 61 therein. By way of example, the rotary joint 74 may be made of brass.

The support member 17 is made preferably of aluminum and has a rectangular recess 76 centrally therein as viewed from the left in FIGURE 2 which receives the wave guide 60. The recess 76 may have a depth of .250 inch and a width of .504 inch. At the upper end of the support member 17 is a flange 77 having an outer diameter of 2.250 inches and an inside diameter of 2 inches and having an axial extent of .500 inch. A recess 78 is provided in the support member 17 and is circumscribed by the flange member 77 for receiving the outer race of the bearing 54. Inwardly of the recess 78 is an annular flange 79 having an inside diameter of 15/16 inch and an axial extent of .005 inch. To the left of the shoulder 79 as viewed in FIGURE 2 is a reduced diameter portion 80 having an internal diameter of .750 inch which receives by a brass adapter 81. The support member 17 includes a pair of tapped holes (not shown) arranged on a 1 inch diameter centrally with respect to a central axis through the recess 76. A corresponding pair of holes are arranged on a 1 inch diameter in the rotary joint member 74 and with the taped holes in the support member 17 receive a pair of screws which secure the rotary joint member 74 in fixed relation to the support member 17 over the wave guide 60.

A brass adapter 81 has an outer diameter of .750 inch and an inner diameter of .177 inch. As viewed in FIGURE 2, the left side of the adapter 81 has a collar member 81a extending therefrom which has an outer diameter of .217 inch which, in turn, extends into a recess for an extent of .211 inch. Also, as viewed in FIGURE 2, the right side of the adapter 81 has an extended collar 81b having an outside diameter of .231 inch for an extent of .125 inch for insertion into the bore of horn member 50. This provides a choke joint between the stationary and rotating portions of the outer conductor of the coaxial line which carries the microwave energy from the waveguide 60 to the sensing roller 12. It will be seen that the adapter 81 in conjunction with the collars 81a and 81b form a stationary outer conductor member and with the conductor member 61 form a coaxial transmission line. This is continued by the bore of the rotating horn member 50 again in conjunction with the center conductor 61. By empirical data, the configuration of the brass adapter 81 is determined so that an impedance match is obtained between the coaxial transmission line formed thereby and the rectangular waveguide 60.

Within the rotary joint 74 is located a choke section 84 which provides a tuned short circuit termination for the conductor 61 and has an outer diameter of .499 inch and is held firmly within a .500 inch diameter bore of the rotary joint member 74. The maximum diameter portion of choke section 84 has an axial extent of .190 inch as compared with the axial extent of .375 inch for the bore of the rotary joint member 74. As mentioned hereinabove, the rotary joint member 74 receives in the bore thereof the outer race of a bearing 67 and is secured therein by the retainer member 69. As viewed in FIGURE 2, the right hand side of the choke section 84 is provided with a reduced diameter portion having an outer diameter of .090 inch and an axial extent of .075 inch. As viewed from the left, the choke section 84 is reduced centrally to provide a cylindrical recess having a diameter of 3/8 inch and a depth of .010 inch in an axial direction.

The choke section 84 may be of aluminum or brass and has an overall axial extent of .265 inch with an axial bore centrally thereof having a diameter of .070 inch to freely receive the 1/16 inch conductor 61.

The horn member 50 of the sensing head 12 may have an outer diameter of 2.8437 inches and an axial extent of .375 inch. To the left of the maximum diameter portion, as viewed in FIGURE 2, the outer diameter of the horn tapers at an angle of 9° for an axial distance of .560 inch. To the left of the tapered section a constant diameter portion is provided for receiving the bearing 54 which has an external diameter of .4725 inch. The constant diameter portion has an axial extent of .315 inch.

Provided at the left end of the horn 50 is a relatively large constant diameter bore having a diameter of .237 inch and an axial extent of .135 inch for receiving the collar 81b. To the right of the relatively large diameter bore is a smaller bore having a diameter of .185 inch. The latter bore connects with a taperer aperture 50a having walls thereof at 22°50′ with respert to the axis of the bore and terminating with a maximum diameter of 5/8 inch. The axial extent of the .185 inch bore and the tapered aperture 50a together is about 1.115 inches.

The horn section 50 has four holes on a 1.500 inch diameter for receiving four screws therein, two of which are the screws 51 and 52. Radially outward of the aperture 50a on the right hand face of the horn section 50 is an annular groove extending from a diameter of 1.747 inches to a diameter of 1.985 inches and having a depth in the axial direction of .062 inch for receiving one end of the inner cylinder 40.

Beginning in the area of the horn 50 a dielectric tube 86 is snugly fitted about the conductor 61. The purpose of the dielectric tube 86 is to guide the surface wave which is applied to the conductor 61 at the wave guide 60 to an end 88 of the tube 86. The dielectric tube 86 may be of polyethylene or of Teflon having a 1/8 inch outer diameter, and a .040 inch inner diameter. The conductor 61 is cut down sufficiently prior to its entrance into the tube 86 to the required diameter. Engaged in the tapered aperture of the horn 50 is a cone 91 having substantially the same coefficient of thermal expansion as the cone section 50 and is provided therein for rigidly holding the tube 86 in a precise axial position where it extends centrally of the tapered section of the horn 50. By way of example, the dielectric tube 86 may vary in wall thickness from .040 inch, in the area of the cone 91, to .100 inch at the end 88 thereof. The purpose of the thicker wall portion of the dielectric tube 86 at the end 88 is to minimize losses of the transmitted microwave energy.

The conductor 61 passes through a guide assembly 89 and a hole 90 in the tube 35 to the groove 34 where it joins with the conductor 33. The guide assembly 89 passes through a hole 91 in the walls of the cylinders 37 and 40 and includes a group of pieces 94, 95 and 98, each having a passage therethrough in end-to-end alignment with one another and in alignment with the end 88 of the tube 86 and the hole 90. Generally the parts 94, 95 and 98 provide a guiding contour for the microwave energy on the conductor 61 to the conductor 33, which is deposited in the groove 34 of the sensing head tube 35. The path of the microwave energy is first about an arc of 90° in a generally axial directed plane through the piece 94, then about an arc of approximately 104° in a plane generally transverse to the axial plane through the piece 95. The two pieces 94 and 95 are each formed by two sector parts, each having a thickness dimension of .250 inch and a curved edge formed on a diameter of .650 inch. The two sector parts of each piece may be secured together by means of a screw extending through an aperture of one sector and engaging a threaded hole in the other sector, the mating holes of the screws being located on a radius of ⅜ inches. Each sector part has a groove arranged on a radius of .570 inch, the groove having a radius of .021 inch so that the assembly has an arcuate passage therethrough with a diameter of about .042 inch for receiving the conductor 61. Therefore, the passage of the curved member 94 has first an arcuate extent of 90°, which then extends into the passage of the piece 95 having an archate extent of 104°. It will be noted herein that the radius of both arcuate passages is greater than one wavelength of the microwave energy.

The third piece 98 of the guide assembly 89 is cylindrically shaped to conform to a slot 91a (shown in FIGURE 6) in an edge of the hole 91 and has one surface cut to conform to an inside surface of the dielectric tube 35. The piece 98 has a straight passageway extending therethrough which is disposed in alignment with an end of the passageway through the piece 95 and the exit hole 90 in a wall of the dielectric tube 35 for receiving the conductor 61 therethrough. The piece 98 has an outside diameter of .400 inch and the passageway therethrough has a diameter of .046 inch. The conductor section 61 extends within the critical angle launching piece 98 and therefrom to the opening 90 in the outer dielectric tube 35.

The guide assembly 89 is employed both for restricting the conductor 61 to a predetermined path which will result in the least amount of energy losses therefrom and to minimize any energy which may be lost from the conductor 61 from reaching the receiving end 32 of the sensing head 12. It is contemplated, however, that other suitable structures may be employed for performing the same functions. For instance, the conductor 61 may have a thin dielectric wall, such as the tube 86, extending its entire length, and allowed to conform to and take the widest arcuate shape in its path through the sensing head 12 for a minimum of losses therefrom. In all cases, the need to minimize the amount of energy reaching the receiving end 32 by any route other than by the conductor 33 and which therefore bypasses the moisture sensing zone adjacent conductor 33, may require the use of an insulating block within the sensing head 12 midway between the launching end 31 and the receiving end 32.

The hole 90 has a diameter of .046 inch and passes through the wall of the dielectric tube 35 axially aligned with the passage through the launching piece 98. At this point, in the vicinity of the aperture 90, the conductor 61 is physically and electrically bonded to the conductor 33 by either soft solder or conductive bonding material or by the chemical and electrochemical deposition of conductor 33 as described above.

By way of example, the optimum dimensions of the dielectric tube 35 have been empirically found to be 7.00 inches long with an inside diameter of 2.686 inches and an outside diameter of 2.817 inches. As shown in FIGURE 3, the helical groove 34 has a width of .040 inch and depth of .020 inch, and a center to center distance between grooves represented by a dimension 101 of .500 inch.

A detailed view of the aperture 90, FIGURES 2 and 3, is shown in FIGURE 4. An axis 90a of the aperture 90 is parallel to a radius of the dielectric cylinder 35 and is spaced .878 inch therefrom as represented by the dimension 103. Optically, an angle 104 is equal to or greater than 39°, and an angle 106 is 20.3° from a reference center line 107. As shown in FIGURE 5, the exit aperture 90 is in a predetermined angularly spaced relation with an entrance aperture 110 and on opposite sides of the center line 107, whereby the angular distance therebetween is 40.6° and the apertures are separated by an axial extent of approximately 5 inches.

The means for guiding the microwave energy from the helical conductor 33 to another axially extending guide assembly 89 at the receiving end 32 of the sensing head 12 may correspond to the parts just described at the launching end 31 thereof. As illustrated in FIGURE 2, the microwave energy is coupled from the transmission line associated with the conductor 61 at the receiving end 32 to a rectangular wave guide 115 leading to a microwave energy measurement means.

It can be appreciated from the above description that the transmission line or conductor 61 carries the microwave energy from the wave guide 60 to the helical conductor 33 with a minimum amount of loss. It is well known that the energy transmitted through the conductor 61 will tend to be radiated from bends in the conductor. That is, the energy will attempt to continue in a straight line rather than following the curved portion of a transmission line. Furthermore, any solid material on a transmission line causes reflection or defraction of energy away from the line. The solution to both of these problems is accomplished by placing the proper amount of dielectric material on the inside of a bend so as to defract the energy by the amount which provides maximum energy transmission around the bend following the transmission line.

Another device which is effective for transmitting microwave energy around a bend might be described as an adaptation of the optical "light pipe." A conductor which is surrounded by relatively thick layer of solid dielectric such as polyethylene, polytetrafluoroethylene or polystyrene about .04 to .10 inch thick is effective at K-band frequencies. The microwave energy will follow the transmission line around bends with less loss by radiation than occurs due to losses within the dielectric, provided the bend radius exceeds one wave length in air. This is employed in the present invention to carry the energy from the launching horns which are located on the axis of the coil formed by the conductor 33 to a point close to the circumference. For the final step of passing through the outer dielectric layer of the tube 35 in which the conductor 33 is embedded, another and almost direct application of optical techniques is employed. The conductor passes through the dielectric of the tube 35 at the critical angle for total internal reflection as given by the optical formula sine $\theta = 1/n$ where $n$ is the refractive index which for a good dielectric is equal to the square root of the dielectric constant. The wave thereby emerges tangentially to the surface of the dielectric and follows the conductor around the circumference of the conductor 33.

By the use of employing the proper amount of dielectric material on the inside of a bend so as to defract the energy by the amount which gives maximum energy transmission around the bend, the conductor 33 embedded in the dielectric of the tube 35 has a minimum of lost energy transmitted therefrom. Because of some inductive coupling which exists between separate turns of the conductor 33 which makes it frequency sensitive, there is provided either a whole number of wave lengths or an odd number of half wave lengths around the loop depending upon the turn spacing.

The single conductor surface wave guide has proved to be highly satisfactory having a number of distinct advantages over other types of guides for this type of measurement purpose. These advantages include: (1) the wave energy is entirely on the outside of the guide where it is readily accessible; (2) the guide will support only one transmission mode which eliminates complications due to energy conversions to other modes having different loss factors; (3) the guide is not selectively sensitive to materials of high dielectric constant such as $TiO_2$ which may be present in the measured substance, as is liable to be in the case with dielectric guides; (4) the guide is inexpensive and uncritical in its dimensions and may be readily and easily bent or formed into desired configurations; and (5) at K-band frequencies, the spread of the energy away from the guide is adequate for effective sensing but can be readily kept small enough to avoid reflections and interference effects from neighboring objects.

It should be noted that the above advantages are achieved by the structures of the present invention. However, the above given dimensions are critical for the particular materials used and in the instance of those given and shown in FIGURE 4, the preferred material is polystyrene.

The helical ribbed cylinder 37, as shown in FIGURE 6, may have an overall length of 7 inches and a maximum diameter at a periphery about the rib 38 of 2.685 inches. The axial width of the helical rib 38 may be 1/16 inch, while the center-to-center distance therebetween may be .500 inch. Located on the helical ribbed cylinder 37 is the aperture 91 having the slot 91a therein and a similar aperture 119 having a slot 119a therein. The slots 91a and 119a pass through the wall of the cylinder at such an angle as to complement the respective launching piece 98 disposed in each.

Figures 7, 8, 9:
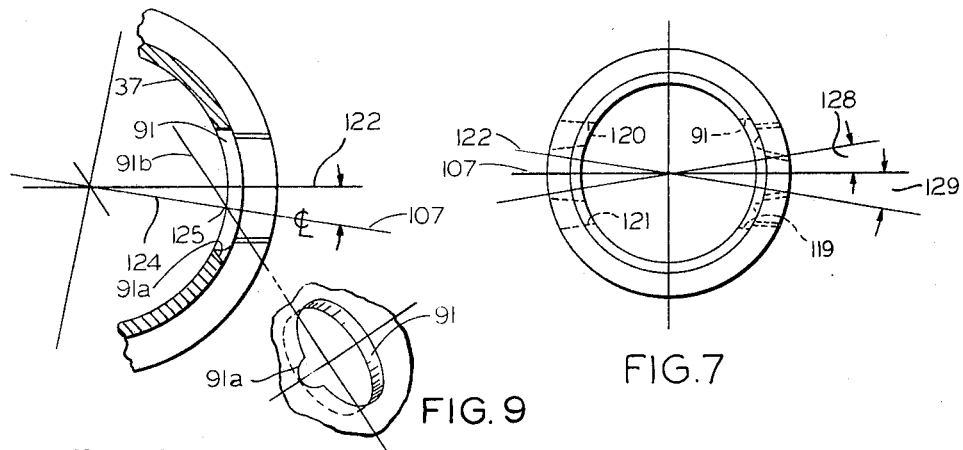
FIGURE 7 is a side view of the spacer illustrated in FIGURE 6.
FIGURE 8 is an enlarged detail view of one portion of the spacer illustrated in FIGURE 7.
FIGURE 9 is a fragmentary detailed view of an oblique projection of the portion of the spacer illustrated in FIGURE 8.

Indicated in FIGURE 7 is the angular relationship between the apertures 91 and 119 in a plane perpendicular to the axes of the helical ribbed cylinder 37. The angles 128 and 129 are exemplified herein as being 9.7° from the horizontal center line 107, for a total angular distance between the centers of the holes 91 and 119 of 19.4°.

As shown in FIGURES 6 and 7, a second pair of apertures 120 and 121 are disposed in a wall of the cylinder 37 diametrically opposite the apertures 119 and 91 respectively. The apertures 120, 121 are provided in diametric opposition to the apertures 91, 119 so as to provide complete balance to the sensing head 12. Under certain conditions, the sensing head 12 may be rotated at speeds in the range of 3,000 r.p.m. and, at such speeds, any unbalance in the sensing head may be undesirable.

FIGURE 8 is a detailed representation of the aperture 91 and the slot 91a which pass through the wall of the cylinder 37. The aperture 91 has a center line 122 which is angularly displaced 9.7° from the reference center line 107. The slot 91a is formed by a hole through the wall of the cylinder 37 having a center line 91b which intersects the reference center line 107 at a point 125 and is angularly displaced 69° therefrom.

The fragmentary oblique projection view of FIGURE 9 better illustrates the relationship of the slot 91a with respect to the aperture 91. The slot 91a receives the piece 98 of the guide assembly 89 therein for guiding the conductor 61 to the hole 90 and to the groove 34.

It can now be appreciated that the conductor 33 receives microwave energy through a low loss transmission on the conductor 61 which carries the energy from the wave guide 60 through the sensing head 12 to the conductor 33. The energy absorption of the material under inspection will, therefore, provide an exact indication of the constituents of that material which have a resonant frequency the same as the frequency of the microwave signal applied to the sensing head 12.

Microwave power guided along an open conductor which follows a curved path suffers appreciable loss probably due to radiation from the conductor. To a first approximation, it appears that the loss in decibles per unit length of wire is nearly proportional to the inverse of the radius of curvature. There are indications, however, that as the radius of curvature is reduced to the order of one wavelength, the losses increase still more rapidly.

It has been found that this loss due to curvature can be reduced or even eliminated by adding a dielectric on the inside of the curve, such as that exemplified herein as the cylinder 35. It seems that the dielectric acts with the microwave energy somewhat analogously to glass with light and refracts the wave so that it follows the conductor indicated in the form of a helical coil at 33 in FIGURE 2. Transmission around a coil by the teaching of the present invention has been effected virtually without loss.

For lossless transmission, it is essential that the radius of curvature be correctly proportioned to the dielectric constant of the dielectric or that the quantity or thickness of dielectric disposed on the inside of the curve be correctly proportioned to the dielectric constant. With a solid dielectric cylinder or sector and too large a radius of curvature or with too great a thickness of dielectric, the wave is refracted off the conductor into the dielectric (as with a dielectric placed on one side only of a straight conductor). With too small a radius of curvature, or too little dielectric, the refraction is insufficient and some of the wave is radiated outward. Exact physicis relationships have not been determined relating optimum radius, dielectric constant and thickness of dielectric (for example the wall thickness of cylinder 35) but the optimum values have been found to be not too critical.

The two cases of a solid dielectric cylinder or sector and of a thin walled cylinder such as for example cylinder 35 will be treated separately. For a solid dielectric cylinder, the following semi-empirical relationship has been found to give satisfactory results:

$$r\ (\sqrt{e}-1)=\lambda/2$$

where $r$ is the radius of curvature, $\lambda$ is the wavelength and $e$ is the dielectric constant of the dielectric. It appears, however, that a radius of curvature less than one wavelength is generally unsatisfactory and that for a radius much greater than a wavelength it is better to use a thin walled tube or thin layer of dielectric on the inside of the curve. For thin walled cylinders it has been found experimentally that the wall thickness should be inversely related to the square root of the dielectric constant but that for a cylinder of any given radius there is a range of thicknesses which is satisfactory. For example, for a polystyrene cylinder 2.8 inches diameter, a wall thickness of between .050 and .080 inch has been found to be satisfactory. Furthermore a wall thickness of polystyrene of .065 inch has been found to give satisfactory results for a sector having any radius of curvature greater than about 1.4 inch. With a thin layer of dielectric such as this adjacent to a conductor the wave tends to stay with the dielectric and conductor combination, being in effect guided by both so that the limitations on the thickness for low loss transmission do not appear to be established only by radius of curvature and dielectric constant. There seems indeed to be a minimum thickness which is related to the dielectric constant and which will satisfactorily cause the wave to follow the conductor round a curve as stated above but for the maximum satisfactory thickness a limitation due to the occurrence of interference between portions of the wave taking different paths within the dielectric seems to be effective before the limitation due to refraction off the conductor becomes important.

Some further improvement in transmission around a curve may be obtained by using a thick conductor, so that the wave on the outside surface of the conductor has further to travel than on the inside surface. A tapered dielectric coating may be supplied to the conductor to match or synchronize the wave travel at all points around the conductor surface including side surface portions as well as outer surface portions and inner surface portions.

A coil may be close or open wound. For a close wound coil where the microwave energy associated with one turn is closely coupled with the microwave energy of an adjacent turn and for a closed loop the length of the loop or of the multiple loops forming a coil is preferably such that the microwave energy which travels about a loop and returns to a point at or adjacent to the entrance point of the loop will have a predetermined phase relation to microwave energy entering the loop. It is found that the characteristics of a loop for a given microwave frequency are critically related to the length of the loop in relation to the wavelength of the microwave signal. Where the length of the loop is equal to a whole number of wavelengths, the field due to the microwave energy entering the loop will be reinforced by the field of the microwave energy which has traveled about the loop and has returned to or adjacent to the entrance point of the loop. If the length of the loop is an odd multiple of ½ wavelength, the field due to the entering microwave signal will be opposite the field due to the microwave energy which has traveled about the loop so that the loop acts as a reflector of the microwave power.

When the length of the loop is adjusted for reinforcement, if the losses around the loop amount to 10%, then the power circulating in the loop must be 10 times the input power before the losses will balance the input. Loop losses as low at 0.1% should be easily obtainable, giving gains in field strength of 1000 times. Thus if a loop type microwave device adjusted for reinforcement is used to detect moisture in paper, a 1% absorption of microwave energy by moisture in the paper would drop the circulating power in the device by a factor of 10 (i.e. 10 db drop from 1000 times) and a 10% absorption would drop the circulating power to 10 times (or a further 10 db drop).

Since the loop length is a whole number of wavelengths for maximum gain, a loop device in accordance with the present invention can be utilized as a wavemeter. Since the device is highly frequency sensitive, the device can also fulfill the same function as a cavity resonator.

It is found that microwave power can be induced from one coil or closed loop to another coil or closed loop placed in close proximity, and in a similar manner to that commonly practiced at lower frequencies in the audio and radio frequency part of the spectrum but never previously attempted at microwave frequencies. At microwave frequencies there are, of course, the special requirements noted above with respect to the means for preventing radiation loss from the coil and with respect to the proportioning of the length of the loops with respect to the wavelength of the applied microwave energy.

It will be observed that a portion of the periphery of the coil 33 is in proximity to the web 13. With relatively thin webs in comparison to the wavelength of the microwave energy transmitted along the coil, no special provision may be necessary to prevent undue radiation of microwave energy at the portion of the coil coupled to the paper web. In fact, the tendency of the microwave energy to be retarded at the region of impingement of the dielectric medium may amplify the effect of the presence of moisture in the paper web and provide a greater apparent power loss.

If it is desired to compensate for the retarding effect on the wave energy of the presence of the web, the region of the coil coupled to the web may be provided with a larger radius of curvature than other portions of the coil so that the retarding effect of a dry paper web, for example, at the region would provide a wave velocity related to the wave velocity at the inner side of the coil in dielectric medium 35 such as to prevent undue radiation from the coil at the region.

As an alternative to detecting the constituent by means of its absorption effect with respect to microwave energy, it would be feasible in all of the embodiments described herein to use a system depending on change of phase of the microwave energy as described in my copending application Ser. No. 260,743.

In any of the embodiments when utilized to sense moisture content, the microwave energy preferably has a frequency of 22,235 megacycles per second which is a resonant frequency for the water molecule. Absorption of electromagnetic energy of this frequency causes a change in the rotational energy of the molecule. There is some small absorption in dry paper fiber, but this appears to be the same for all finishes and coatings, and a universal moisture calibration has been obtained for all papers thus far tested. This calibration can be done in the laboratory and the instrument when installed on paper machinery should give an absolute accuracy of ±0.25 in the measurement of percent moisture content. The relative accuracy from one point in the sheet to another should be ±0.1% $H_2O$ or ±1% of the value indicated, whichever is greater (these two tolerances are the same at an indicated reading of 10% $H_2O$).

The absorption of the energy, measured in decibels, by the water in the sheet is not directly proportional to the total mass of water within the sensing zone but appears to obey the following formula:

$$W = \sqrt{\frac{KA}{F^n}} - C$$

or $$A = \frac{F^n W^2}{K} + \frac{C}{K} F^n$$

where

A is the absorption in decibels
F is the sheet weight dry
$n$ is a constant slightly less than or equal to 1
W is the percent water content
K and C are constants.

The fact that $n$ may be slightly less than 1 indicates that the absorption by two identical sheets laid one on top of the other may be slightly less than double due to one sheet. This is thought to be due to the fact that the field falls off proportionately with the distance from the surface of the sensing head. If this is correct, variations in caliper and in the location of the water in the sheet may cause some error, but even for heavy board grades this will not exceed the tolerances quoted above (It is noteworthy that the energy does not fall off with the square of this distance from the surface of the particular type of wave guide which is employed). In a particular laboratory model, which has a cylindrical sensing element of 1.2″ outside diameter, $n$ is equal to 0.886. For the production models which have larger diameter cylinders, $n$ has been found to be equal to 1.

The fact that the absorption is proportional to the second power of the percent moisture was unexpected but has been repeatedly confirmed and is further illustrated by the fact that the absorption by water condensed in paper is about three orders of magnitude greater than by the same quantity of water in the vapor-phase where the concentration is substantially less by about three orders of magnitude. According to the formula, the absorption is proportional to the number of molecules present and to their concentration.

The physical form of the sensing head in question is a cylinder, approximately 3 inches in diameter, which will rotate freely in contact with the sheet. The sensing length can be between 1.5 and 4 inches on a cylinder of approximately 7 inches in length. The unit will be entirely on one side of the sheet and can be arranged to transverse across the sheet width, if desired.

The meter will be arranged to read out directly in percent moisture, the effect of basis weight changes being taken care of by means of an adjustable control which can be set manually or adjusted automatically by a basis weight measuring instrument mounted alongside the moisture measuring unit. In the latter case, the read out from the basis weight meter can be arranged to be as bone dry basis weight.

In the case of a traversing unit, the read out would be on an X–Y recorder with position across the machine on the X-axis and the moisture percent on the Y. An integrated reading, giving the mean moisture content of the whole sheet, would also be displayed.

The term "surface wave" is utilized to refer to wave energy conducted along a surface sharply separated by two media of different electric properties which exert a guiding effect of the electromagnetic wave. The surface separating a conductor from an insulator, or the surface separating two different insulators of markedly different dielectric constants may be utilized. Such surfaces will herein be termed "surface wave transmission lines" when utilized to guide microwave energy as a surface wave. It will be apprecated that the method of the present invention is particularly applicable to materials which absorb relatively little microwave power at one or more frequencies, which frequencies are readily absorbed by mositure contained in or on the material. The term "moisture content" is utilized herein the comprehend moisture contained either on the surface of the material or in the material, or both.

The present invention is, of course, applicable to determining the moisture content of stationary as well as moving webs. Generally, the invention is directed to detecting the moisture content of non-metallic inorganic materials and organic materials. It is contemplated that the invention will have particular application to cereals, dried foods, flour, breakfast foods, bakery mixes, dehydrated proteins, carbohydrates and cellulose materials.

In each of the embodiments, the microwave generating means preferably generates a frequency which is a resonant frequency with respect to the constituent of the material to be sensed while the frequency is such as to be relatively unaffected by the material itself. While troubles from standing waves due to reflection of microwave energy do not seem to be serious with single conductor surface wave transmission lines, each of the microwave generating means of the disclosed embodiments may generate a frequency modulated microwave signal so as to average out any small effects which may exist. Frequency modulation will reduce the criticality of the thickness of the dielectric coating on the transmission line where such is provided and will reduce the effects of variations in this thickness along the length of the line. By way of example for sensing moisture content in the illustrated embodiment, the frequency of the microwave generator may be varied over a range of 1250 megacycles per second, for example, between 21,500 and 22,750 megacycles per second. The micropower may be generated by means of a suitable klystron having a cavity whose dimension may be varied by mechanical means. The mechanical means may be controlled by means of a solenoid energized so as to cyclically vary the frequency generated by the klystron over a frequency range such as indicated above. If crystal detectors are utilized, pulse modulation may be introduced to provide an electrical variation of the power supply to the klystron at a suitable low frequency rate. The klystron electric supply power may be varied in step with the mechanical variation of the cavity as needed to maintain operation of the klystron at substantially constant power level. A suitable attenuator for adjusting the power transmitted from the klystron may also be provided.

In the embodiment described and shown in the drawing, the wave guide comprises a member having an exterior surface which is good electrical conductor, rather than a semiconductor or insulator. For example, the member may be of hardened steel and be in sliding contact with the material under test depending upon the nature thereof. Alternatively, the wave guide may comprise a metallic conductor having a thin coating of wear resistant material which may be in sliding contact with the material under test, a suitable coating being an aluminum oxide ceramic known as "Rockide." In the case of an open wire wave guide of this type, the microwave energy will surround the guide and extend approximately the distance of one wavelength from the external surface of the guide.

In each of the embodiments where there is a dissymetry with respect to the dielectric constant of materials in the space about the transmission line, velocities may be equalized to reduce radiation from the line to a desired minimum.

The term "conductor" is used herein in a broad sense to include good conductors and semiconductors but to exclude dielectrics, or nonconductors of electricity.

The term "transmission line" is used herein to cover wave guides generally regardless of cross-section, and is intended to comprehend wave guides of either conductive or dielectric material. The term "constituent of material" is intended in its broadeset sense to cover substances within or on a material and capable of differentially affecting microwave energy. The constituent may, of course, be an impurity rather than a normal part of the body of material.

Figure 10:
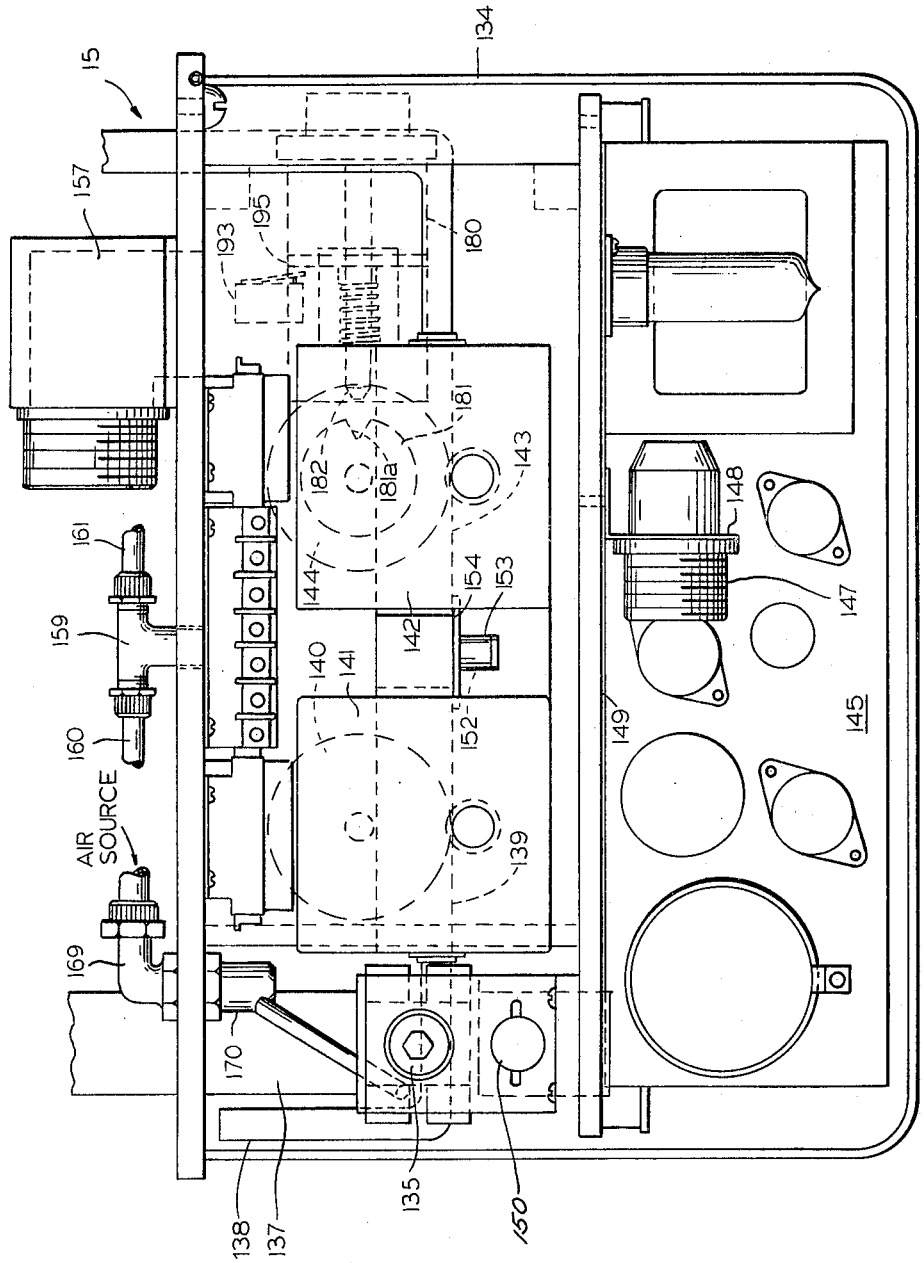
FIGURE 10 is a somewhat diagrammatic illustration of a radio frequency unit incorporating novel concepts of the present invention.

FIGURE 10 is a diagrammatic view of the component parts incorporated in the R.F. unit 15. Located within a cabinet 134 is a klystron 135, which has a nominal operating frequency of 22,235 megacycles per second. Connected to the klystron 135 is a wave guide 137 which receives the microwave energy from the klystron 135 and transmits it to the wave guide 60, FIGURE 2. However, a portion of the microwave energy is also applied from the wave guide 137 through a coupling wave guide 138 to a wave guide 139. An adjustable attenuator 140 is disposed within the wave guide 139 and is driven by a zeroing servomotor 141. A second wave guide 143 is connected in series with the receiving end 32 of the sensing head 12. A second adjustable attenuator 144 is disposed within the wave guide 143 and is driven by a balancing servomotor 142 to provide adjustment thereof. A pair of crystal detectors 152 and 153 are mounted on a common block 154 which extends between each of the wave guides 139, 143. Mounting of the detectors 152 and 153 on the common plate 154 provides the same thermal environment to each, which is required for stable operation of the system. Furthermore, a lead wire is not required between their respective cathodes which also aids in the stability of the system. A probe at the end of the wave guide 139 is connected to the anode of the detector 152 and a probe at the end of the wave guide 143 is connected to the anode of the detector 153.

The crystal detectors 152, 153 detect the amount of energy in each of the wave guides 139, 143 which has been attenuated by the attenuators 140, 144 and provide an error signal to an amplifier 145. After the system is placed in balance, the attenuator 140 is maintained at a constant value by a brake acting on the zeroing servomotor 141 and any subsequent losses developed in the sensing head 12 will be detected by the crystals 152, 153 and provide the error signal to the amplifier 145. This error signal is amplified by the amplifier 145 to drive the balancing servomotor 142 until the attenuator 144 reaches an attenuation level at which a zero difference exists between the signals from detectors 152, 153. Adjustment of the attenuator 144 to this level is also made to provide an input signal to a computer in the system for indicating the moisture content of the paper web 13. This cooperation of the elements, however, will be more fully realized and understood from the detailed description hereinbelow of the electrical circuitry of the system.

A multicontact connector 147 is fixedly secured in a bracket 148 to a chassis 149 within the cabinet 134. Also located in the cabinet 134 is a thermal switch 150, which is employed to protect the klystron 135 from excessive operating temperatures.

Located at the upper end of the R.F. unit 15 is an adapter plug 157 for connection to the multiconductor cable 21 of FIGURE 1. A T-fitting 159 is provided with a pair of output tubes 160 and 161 which are connected to the support members 17 and 18 of the sensing head illustrated in FIGURE 2. The tubes 160 and 161 are secured into the base of the supports 17 and 18 by means of tapered fittings 163 and 164, which wedge the tubings 160 and 161 in a secured position, as illustrated in FIGURE 2. The tubes 160 and 161 provide a supply of air to the sensing head 12 through a cavity 165 formed in the support member 17 and a pair of passages 166. The passages 166 extend from the cavity 165 to a recess 167 formed by the flange 77. This supply of air maintains a pressure differential across the opening provided between the flange 77 and the end of the member 50 to maintain the bearings and other components therein purged of dust and other foreign particles, such as paper fibers. A fitting 169 is secured to the top of the cabinet 134 and a tube 170 extends therefrom for playing a stream of cooling air on the klystron 135. This supply of air passes from the end of the tube 170 over the klystron 135 and the other components within the cabinet 134 to the fitting 159 to provide the purging air for the sensing head 12.

A zeroing mechanism 180 is provided for establishing a maximum value of attenuation by the attenuator 144 which is connected in series with the sensing head 12 when the paper web 13 is removed from the sensing relationship therewith. Since the sensing head 12 presents a minimum of loss to the microwave energy without any material thereover, this maximum attenuation provides a zero reference to the system. After the zero reference is established, the attenuator 140 is locked into a fixed position and subsequent sensing of the paper web 13 provides the unbalance described above.

Cooperating with the zeroing mechanism 180 is a disk 181 which has a notch 181a therein. At periodic intervals, when no constituent is being sensed, a pin 182 of the zeroing mechanism 180 will perform to engage the notch 181a of the disk 181 to provide the maximum attenuation adjustment for comparison with the output of klystron 135, thereby compensating for variations in microwave energy losses sensed between the launching and receiving ends of the sensing head 12.

Figure 11:
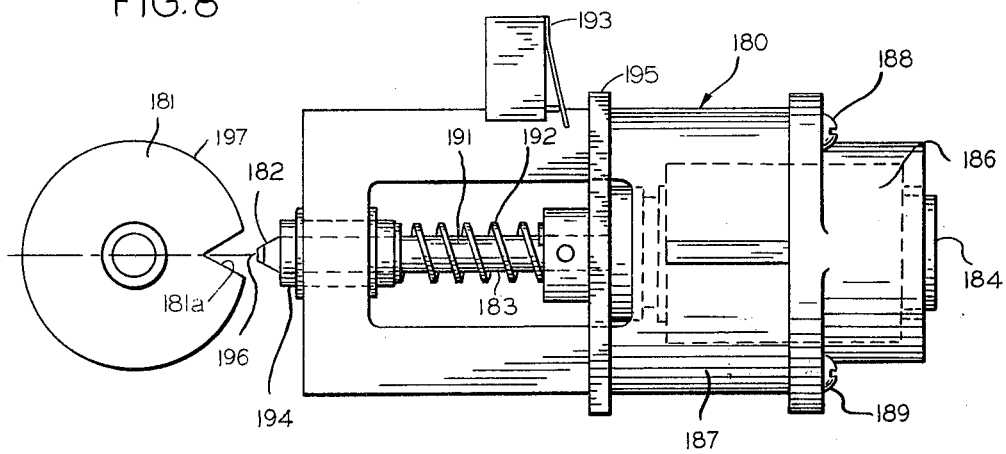
FIGURE 11 is a detailed view of a solenoid actuated zeroing device constructed in accordance with the principles of the present invention and employed in FIGURE 10.

As shown in FIGURE 11, the preferred construction of the zeroing mechanism 180 is illustrated. A solenoid 186 is located in a body member 187 and secured therein by means of screws 188 and 189. A plunger 191 of the solenoid 186 supports the pin 182 at one end thereof, which is urged to the right, as shown in FIGURE 11, by a spring 192. A bearing 194 is provided in the housing 187 for receiving the pin 182. The plunger 191 includes a section 183 of non-magnetic material and a section 184 of magnetic material. The section 183 is disposed at one end of the solenoid 186 and the section 184 is disposed at the other end thereof such that energization of the solenoid 186 causes the plunger 191 to move to the left as viewed in FIGURE 11.

The disk 181 is disposed for rotational movement by the motor 142 and when the pin 191 is actuated to the left, as viewed in FIGURE 11, rotation of the disk 181 will cause engagement of the pin 182 with the notch 181a. Alignment of the notch 181a with the pin 182 provides a maximum value of attenuation setting to the attenuator 144. Therefore, when it is desired to place the system in zero reference, the solenoid 186 is actuated causing an end 196 of the pin 182 to bear against a peripheral surface 197 of the disk 181 until the disk is rotated sufficiently to cause engagement of the pin 182 with the notch 181a. When the solenoid 186 is deenergized, the pin 191 is withdrawn under the compressive action of a spring 192 and the disk is free to rotate as dictated by the motor 142.

A microswitch 193 is mounted adjacent the zeroing mechanism 180 and is disposed for actuation by a member 195 when the solenoid 186 is actuated. The member 195 is mounted on the pin 191 and when the solenoid 186 is actuated, the member 195 moves to actuate the switch 193. The specific function of the switch 193 will be explained in more detail in the following figures.

Figure 12:
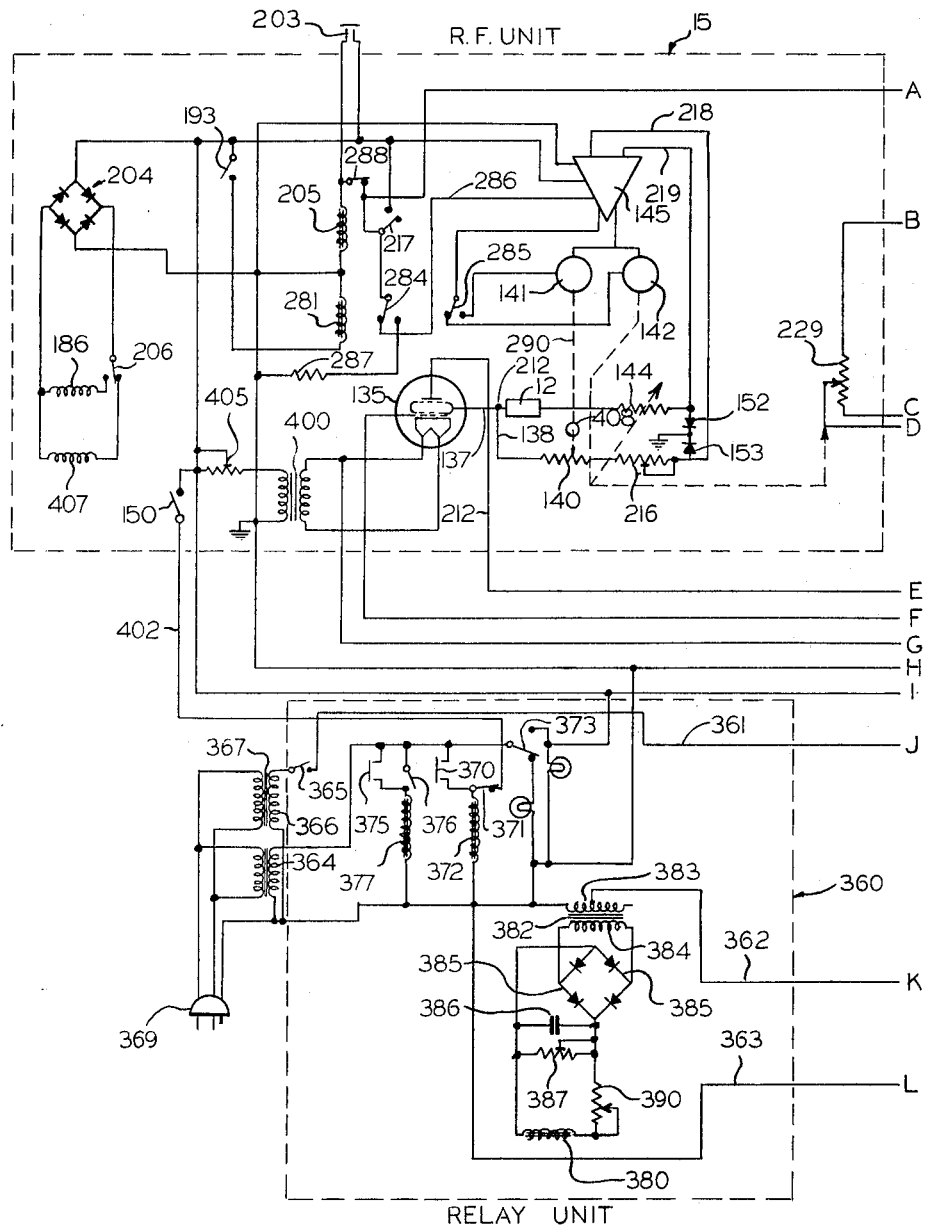
FIGURE 12 is a part of an electrical wiring diagram showing the preferred electrical components and circuitry required in the constituent sensing system of FIGURE 1.
Figure 13:
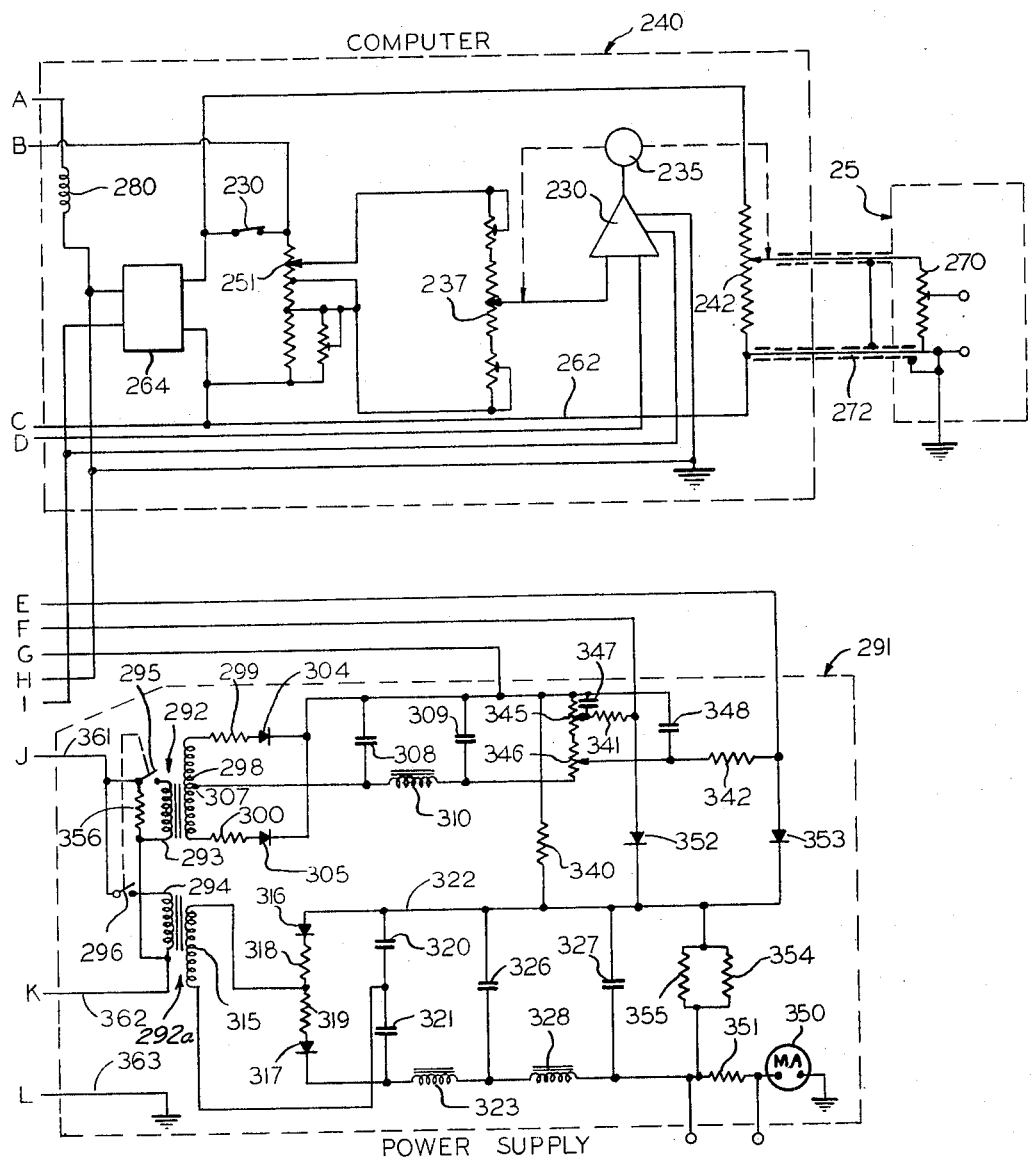
FIGURE 13 is another part of the electrical wiring diagram showing the preferred electrical components and circuitry required in the constituent sensing system and should be taken in connection with FIGURE 12.

FIGURES 12 and 13 illustrate schematically the preferred embodiment of the circuit employed in the present invention. The complete circuit is divided between the two FIGURES 12 and 13 for purposes of clarity and are connected to one another through the common lines A through L. As illustrated in FIGURE 13, a power supply 291 is provided with two power transformers 192, 292a, having primary windings 293 and 294, each connected through a pair of switches 295 and 296 to a line 361. A secondary winding 298 of the transformer 292 is connected at respective ends thereof through a pair of resistors 299 and 300 to the anodes of a pair of diodes 304 and 305 respectively.

A pair of capacitors 308 and 309 and a choke 310 form a pi filter circuit which is connected between the respective cathodes of the diodes 304, 305 and a center tap 307 of the secondary winding 298 to eliminate extraneous variations in the resultant DC voltage. A secondary winding 315 of the transformer 292a has one lead thereof connected to a pair of diodes 316 and 317 through a pair of resistors 318 and 319 respectively. The other lead of the secondary winding 315 is connected to a pair of capacitors 320 and 321 which form a voltage doubler circuit. Another pi filter including a pair of capacitors 326 and 327 and a pair of choke windings 323 and 328 are connected acros the voltage doubler circuit.

Resistors 340, 341 and 342 together with the potentiometers 345 and 346 form a variable voltage divider network which is employed to adjust the operation of the klystron 135 for optimum performance. A pair of capacitors 347 and 348 are employed to filter unwanted high frequency from the klystron 135. A pair of diodes 352 and 353 are connected between one end of the voltage doubler circuit and the variable voltage divider network. A pair of resistors 354 and 355 are connected in parallel with the capacitor 327 and a meter 350 has one end grounded and the other end connected through a resistor 351 to the choke 328.

A thermosensitive element 356 is connected in parallel with the input to primaries 293, 294 of the transformers 292, 292a, and performs to operate the switches 295, 296. Therefore, when voltage is initially applied to the power supply 291, switches 295, 296 do not close until element 356 has heated to a sufficient level and it is arranged that switch 295 closes first followed a few seconds later by switch 296 when element 356 has heated still further. Thereafter, current continues to flow through the element 356 as long as voltage is applied thereto, to maintain the switches 295, 296 closed. Power is supplied from the power supply 291 to the klystron 135 through the terminals E, F, G, and ground. AC voltage is supplied to the power supply 291 through the line 361 and a return line 362 connected to a pair of common terminal points J and K respectively. The lines 361, 362 are connected through a relay unit 360 and a power transformer 367 to an electrical outlet plug 369 (FIGURE 12). A line 363 provides a common ground for the power supply 291 and the relay unit 360.

The relay unit 360 is connected to the power supply 291 through the lines 361, 362 and 363 and is employed to control the operation of the constituent sensing system. A main power switch 365 is connected in the line 361 and is connected to one end of a secondary winding 366 of the transformer 367. A start switch 370 is connected to a relay contact 371 and in series with a relay coil 372, and an off switch 375 is connected in parallel with a relay contact 376 and in series with a relay coil 377. The relay contact 371 is normally closed and is actuated to an open position by the relay coil 377. Likewise, the relay contact 376 is normally open and is actuated to a closed position by a relay coil 380 located in a secondary circuit of an overload transformer 382.

The overload transformer 382 is provided with a movable tap 383 which determines the amount of current induced in a secondary winding 384 thereof. A bridge rectifier circuit 385 is connected to the secondary winding 384 and has the DC terminals thereof connected to a capacitor 386 and an adjustable resistor 387. Connected in series with the relay coil 380 is a potentiometer 390 which controls the sensitivity or amount of current required to actuate the relay coil 380. The switch 365 and a relay contact 373 are controlled by the relay 372. In this manner, actuation of the start switch 370 closes the switch 365 and the contact 373 to apply power to the power supply 291 and to the R.F. unit 15. When overload condition exists, the relay 380 is excited to actuate relay contact 376 to place the AC voltage across the relay 377. Since the relay contact 371 is controlled by the relay 377, an overload condition will remove voltage from the relay 372 and open the relay contact 373 and the switch 365. Likewise, actuation of the stop switch 375 will energize the relay 377 to open the relay contact 371 and deenergize the relay 372. When the relay contact 371 is closed, voltage is supplied to the relay 372 through the relay contact 373, the thermo switch 150 and the relay contact 371.

It will be appreciated that power will not be applied to the klystron 135 immediately upon actuation of the switch 370, since the element 356 provides a delay to the energization of power supply 291. Therefore, the filaments of klystron 135 will have an opportunity to heat before power is applied thereto.

Located in the R.F. unit 15 is a filament transformer 400 which has a secondary winding thereof connected to the filament of the klystron 135 and a primary winding thereof connected through a resistor 405 to the thermo switch 150. The resistor 405 is adjustable for providing optimum operation of the klystron 135. When the operation of the klystron 135 is endangered by an excessive amount of heat, the switch 150 opens to remove power from the system. When the switch 150 closes again, power is not reapplied until the start switch 370 is again actuated and the element 356 has again responded with a time delay in the closure of switches 295, 296.

The zero switch 203 is located externally of the R.F. unit 15 and senses an extreme condition of lateral movement of the sensing head 12 with respect to the paper web 13. One side of the switch 203 is connected to the AC supply voltage through the switch 373. The supply voltage is likewise connected through a bridge rectifier 204 and through a switch 206 to either the zero solenoid coil 186 or to a brake coil 407. When the switch 203 is actuated, a relay holding coil 205 is energized which actuates the switch 206 to energize the zero solenoid coil 186. It can be appreciated that when the switch 203 is not actuated, the switch 206 energizes the brake holding coil 407. The brake coil 407, when energized, engages a brake 408 on the output shaft of the motor 141, to lock the motor 141 in position.

The AC supply voltage is connected through the switch 203 to the relay 205 and through the microswitch 193 to a relay 281. The relay 205 controls the switch 206 and another switch 217. The relay 281 controls a pair of switches 284 and 285. The switches 217 and 284 perform to connect the AC voltage to a line 286 to provide an override to any input supplied to the amplifier 145. The switch 285 performs to connect an output of the amplifier 145 to one of the motors 141, 142. A thermosensitive element 287 is connected to one contact of the switch 284 and controls a nomally closed switch 288.

The klystron 135 which oscillates at a frequency of 22,235 megacycles, has in proximity with an output thereof the coupling wave guide 138 to receive microwave energy from the wave guide 137 as indicated by the circuit point 212. The total energy supplied by the klystron 135 to the wave guide 138 is in the order of 1%. Therefore, the 1% energy absorbed in the wave guide 138 is employed as a standard reference to compensate for any difference between the energy levels entering and leaving the sensing head 12. The wave guide 138 is connected to the attenuator 140 which in turn is connected to a manually adjustable microwave attenuator 216 and therefrom to the amplifier 145 through a line 218. The crystals 152, 153 are connected across an input on the line 218 and a line 219 of the amplifier 145. Crystals 152, 153 have their cathodes connected together and to ground.

The amplifier 145 which senses any unbalance between the input energy from the line 218 and from the line 219, drives either the balance motor 142 associated with the balance attenator 145 to maintain the circuit in a balanced condition or drives the zero motor 141 associated with the attenuator 140 during initial setup and readjustment of the system. The drive for the balance attenuator 144 is also coupled to a 1,000 ohm potentiometer 229 which provides an output across the terminals B, C and D of the R.F. unit 15.

When the system is employed and is operating to measure moisture content in a paper web, the respective switches illustrated in FIGURE 12 are shown in their desired positions. Therefore, the amplifier 145 is connected through the switch 285 to the balance motor 142 to continually maintain the attenuator 144 in a balanced position. Any unbalance of the attenuator 144 provides an output signal across the lines 218, 219 to drive the attenuator 144 through the motor 142 back to a balanced condition. This change of the attenuator 144 is provided at an output of the R.F. unit 15 across the resistor 299. However, in order to provide an adequate measurement of the moisture content in the paper web, a zero reference must be established in the system. This zero reference may be established at the end of each successive pass of the sensing head across the paper web 13 at a time when the sensing head 12 is removed from the paper web 13 or at any time it is deemed necessary. This extreme position of lateral movement of the sensing head 12 with respect to the paper web 13 actuates the zero switch 203 to apply the AC supply voltage to the relay 205. Energization of the relay 205 actuates the switches 206, 217 to cause energization of the solenoid 186 and to supply an override signal to the amplifier 145 to drive the balance motor 142 at a relatively fast rate. When the motor 142 has rotated sufficiently to allow the pin 182 of the solenoid 186 to fall into the notch 181a of the disk 181, the microswitch 193 will be actuated. Actuation of the switch 193 places the AC supply voltage across the relay 281 to cause actuation of the switches 284, 285.

At this position of the switch contacts, the AC supply voltage is applied across the thermosensitive element 287, the override on the line 286 is removed from the amplifier 145, and an output of the amplifier 145 is applied to the zero motor 141. Since the attenuator 144 presents a maximum value of attenuation to an output of the sensing head 12 at a time when the pin 182 is aligned with the notch 181a, a signal will be applied to the amplifier 145 indicating any unbalance at the crystals 152, 153. Therefore, the zero motor 141 will be driven until the attenuator 140 reaches a value which causes a balance in the system. This balance will be maintained until the thermosensitive element 287 actuates the switch 288 and removes the AC supply voltage from the relay 205. When the relay 205 is deenergized, the switches 206, 217 will return to the position shown in the drawing and the brake coil 407 will be actuated to engage the brake 408 on the motor 141. Also, actuation of the switch 206 releases the solenoid 186 to cause an opening of the microswitch 193 and deenergization of the relay 281. Therefore, the switches 284, 285 will be returned to their position as shown in the drawing and the system will be readjusted for making another scan of the paper web 13.

A voltage drop developed between the terminal B and the slide arm on the resistor 229 supplies an input to a computor 240 between the terminals B, D. As illustrated in FIGURE 13, a regulated voltage supply 264, preferably of 9 volts, is connected through a switch 230 across the potentiometer 229 and a potentiometer 251. The regulated voltage supply 264 is connected directly across a potentiometer 242. The potentiometers 229, 242 and 251 are linear resistance potentiometers. Connected across a portion of the potentiometer 251 is a potentiometer 237 having a slide arm thereof connected to an input of the amplifier 230. The slide arm on the resistor 229 is also connected through the terminal D to another input of the amplifier 230. The potentiometer 237 is a square law potentiometer wherein linear changes of the slide arm result in resistance changes of a squared value. Therefore, the amplifier 230 compares a voltage drop between the terminal B and the slide arm of the resistor 229 with a voltage drop across an upper portion of the potentiometer 251 and the upper portion of the resistor 237.

The amplifier 230 has an output thereof connected to a motor 235 which controls the position of the slide arms on the potentiometers 237, 242. Therefore, when an unbalance occurs in the system, the slide arm on the potentiometer 229 is accordingly repositioned with the attenuator 144 to rebalance the system. A change in the position of the slide arm on the resistor 229 is sensed by the amplifier 230 which drives the slide arm on the resistor 237 until a zero difference signal is realized at an input of the amplifier 230. However, the slide arm on the resistor 237 varies in position by the square root of the distance moved of the slide arm on the resistor 229.

The slide arm on the resistor 242 provides an input signal to the recorder 25 across a resistor 270 therein. It can be readily appreciated that the change in position of the slide arm on the resistor 237 produces a corresponding change in position of the slide arm on the resistor 242. Therefore, since energy absorption in the paper web 13 increases by the square of the water content increase therein, the output developed across the resistor 270 is proportional to the water content. It can be appreciated that the energy absorption increase or change is applied as a voltage drop change on the linear resistor 229. This voltage drop is applied to the amplifier 230 and compared to a voltage drop on the square law resistor 237. When the motor 235 drives the slide arm on the resistor 237 until the voltage drops are equal, the slide arm on the resistor 237 will have moved a different distance as prescribed by the square law function thereof than that of the slide arm on the resistor 229. The linear distance of movement of the slide arm on the resistor 237 is also the distance through which the slide arm on the resistor 242 will be moved by the motor 235. Therefore, a voltage drop change on the resistor 242 caused by movement of the slide arm thereon is the square root of the voltage drop change on the resistor 229. In this manner, the computer 240 functions to perform the operation required by the aforementioned formulas. The set-up of the voltage dividing networks in the computer 240 provide the necessary constants which are required in the computation of the moisture content.

A relay coil 280 actuate the normally closed switch 230 during any zeroing operation and removes the voltage from the regulated voltage supply 264 from the potentiometers 229, 237, and 251 while maintaining voltage to the recorder potentiometer 242. The relay 280 and its associated switch 230 locks the recorder in its last position during the zero operation so that the recorder will not be driven off scale during such operation.

During any break in the paper web, it may be necessary to remove the sensing head 12 from its sensing position. In the preferred embodiment, the entire unit including the sensing head 12 and the R.F. unit 15 are pivoted out of the path of the paper travel on the carriage 16. A sheet break detector may be employed which detects any break in the paper web and may be employed to actuate another cylinder connected to the carriage 16 and provide pivoting of the entire unit away or out of the path of the paper travel.

The principles of the invention explained in connection with the specific exemplifications thereon will suggest many other applications and modifications of the same.

What is claimed is:

1. Apparatus for sensing moisture content of a moving paper web comprising:
    (a) a core of dielectric material,
    (b) a surface wave transmission line in the form of a helix encircling said core and supported thereby and providing a helical surface wave path having a series of turns,
    (c) means coupled to said surface wave transmission line for transmitting microwave energy of approximately a resonance absorption frequency for water along said surface wave transmission line as a surface wave with the surface wave travelling successively about said series of turns of said helical surface wave path,
    (d) means for supporting a moving paper web in sensing relation to said surface wave transmission line but within the field of said surface wave transmitted therealong, and
    (e) means for sensing the effect of said paper web on the transmission of microwave energy along said helical surface wave path as a measure of the moisture content of said paper web,
    (f) wherein the improvement comprises said cylinder and said second conductor having the same coefficient of thermal expansion.

2. An apparatus for sensing a constituent in a material comprising:
    (a) a sensing head disposed adjacent the material and having microwave transport means helically disposed about the periphery thereof,
    (b) dielectric means having a helically ribbed surface disposed in said sensing head for isolating microwave energy transfer between adjacent helical coils of said transport means,
    (c) microwave transmission means connected to said transport means for applying microwave energy to said transport means, and
    (d) means for sensing the amount of microwave energy absorbed from said transport means by the constituent and giving an indication of the quantity of the constituent.

3. An apparatus for sensing a constituent in a material comprising:
    (a) a sensing head disposed adjacent the material and having microwave transport means helically disposed about the periphery thereof,
    (b) dielectric means having a helically ribbed surface disposed in said sensing head for isolating microwave energy transfer between adjacent helical coils of said transport means,
    (c) microwave transmission means connected to said transport means for applying microwave energy to said transport means,
    (d) first detector means for detecting a portion of said microwave energy applied to said transport means,
    (e) second detector means for detecting the microwave energy at the end of said transport means,
    (f) reference means connected to said first and second detector means for producing a reference signal indicative to the difference between the microwave energy applied to said transport means and the microwave energy received at the end of said transport means when said sensing head is out of sensing relation of said material, and
    (g) means connected to said first and second detector means for indicating the quantity of constituent associated with said material when the material is in sensing relation with said sensing head.

4. An instrument for measuring the amount of a constituent in a material comprising:
    (a) a sensing head disposed for placement adjacent the material and having a launching end and a receiving end,
    (b) a source of radio frequency energy connected to said launching end, and
    (c) means for measuring losses of energy through said sensing head including:
        (1) first attenuator means coupled to an output of said source, (2) second attenuator means coupled to said receiving end of said sensing head, (3) detecting means connected to each of said attenuator means, (4) means for adjusting said second attenuator means to a maximum value of attenuation when said sensing head is removed from the material, (5) means for adjusting said first attenuator means to a fixed value of attenuation when said sensing head is removed from the material to provide a zero output of said detector means, (6) means for maintaining said first attenuator means at the fixed value of attenuation, (7) means for adjusting said second attenuator means to a balancing value of attenuation when said sensing head is disposed adjacent the material to provide a zero output from said detecting means, and (8) means for sensing a difference between the fixed value and the balancing value.

5. A sensing head for a microwave instrument comprising:

(a) a cylinder having a helical groove in an external surface thereof and a hole from said groove through a wall thereof, (b) a pair of end pieces, each connected to respective ends of said cylinder and each having a cone-shaped recess therein in juxtaposed relationship to one another, said end pieces having an aperture therethrough extending from an apex of said cone-shaped recess, (c) a pair of inserts having an aperture therethrough each conformably shaped to and mounted in a respective one of said cone-shaped recesses, (d) a tube having a helical rib on an external surface thereof disposed in said cylinder and positioned within said cylinder such that said groove lies on a center line between respective portions of said rib, said tube having an opening in one wall thereof, (e) guide means disposed in the opening of said tube and including an aperture therethrough having a center line extending from a center line of said tube to a line perpendicular to a plane through the center line of said tube and defining an arcuate path having a preselected radius, (f) a first conductor extending through the apertures in one of said end pieces, one of said inserts, said guide means, and said hole in the wall of said cylinder, and (g) a second conductor connected to said first conductor and disposed in said groove.

6. A sensing head for a microwave instrument comprising in combination:

(a) a radio frequency energy unit, (b) a cylinder having a helical groove in an external surface thereof and a hole from said groove through a wall thereof, (c) a pair of end pieces, each connected to respective ends of said cylinder and each having a cone-shaped recess therein in juxtaposed relationship to one another, said end pieces having an aperture therethrough extending from an apex of said cone-shaped recess, (d) a pair of inserts having an aperture therethrough each conformably shaped to and mounted in a respective one of said cone-shaped recesses, (e) a tube having a helical rib on an external surface thereof disposed in said cylinder and positioned within said cylinder such that said groove lies on a center line between respective portions of said rib, said tube having an opening in one wall thereof, (f) guide means disposed in the opening of said tube and including an aperture therethrough having a center line extending from a center line of said tube to a line perpendicular to a plane through the center line of said tube and defining an arcuate path having a preselected radius, (g) a first conductor having one end thereof connected to said radio frequency energy unit and the other end thereof extending through the apertures in one of said end pieces, one of said inserts, said guide means, and said hole in the wall of said cylinder, said first conductor having radii greater than one wavelength of radio frequency energy from said radio frequency energy unit, and (h) a second conductor connected to said first conductor and disposed in said groove.

7. The sensing head of claim 6 in which said first conductor protrudes through said cylinder at a predetermined angle, the sine of said angle being equal to the index of refraction of the dielectric material.

8. Microwave apparatus comprising:

(a) a rotatable helical surface wave guide providing a helical surface wave path and rotatable about a central axis, (b) an input surface wave line having an axially extending part extending along a path lying in alignment with the central axis of the helical surface wave guide and a radially extending part joining said axially extending part with the helical surface wave path of said helical surface wave guide, and (c) stationary means for coupling microwave energy to said axially extending part while accommodating rotation of said input surface wave line and said helical surface wave guide for producing a surface wave traveling along said axially and radially extending parts and then along the successive turns of the helical surface.

9. The method of sensing a constituent of a material differentially affecting microwave energy at a resonance frequency which comprises projecting a microwave signal substantially of the resonance frequency along a path including the material, sensing the effect of said constituent on said signal, and modulating the frequency of the microwave signal over a freqeuncy range near said resonance frequency so as to tend to average out any effects due to standing waves.

10. The method of sensing a constituent of a material differentially affecting microwave energy at a resonance frequency which comprises projecting a microwave signal substantially of the resonance frequency along a path including the material, modulating the frequency of the microwave signal over a frequency range near said resonance frequency, and detecting an average value of the frequency modulated signal as affected by said constituent so as to tend to average out any effects due to standing waves.

11. The method of sensing moisture content of a moving web which comprises projecting a microwave signal along a path including said web, sensing the effect of said moisture content on the microwave signal, and cyclically varying the frequency of the microwave signal over a range of the order of 1250 megacycles per second in the neighborhood of 22,000 megacycles per second.

12. In combination, means for projecting a microwave signal along a path including a material whose moisture content produces a resonance effect at a resonance absorption frequency of approximately 22,235 megacycles per second, means for sensing the effect of said moisture content on said signal, and means for varying the frequency of said signal over a range of about 1250 megacycles per second in the neighborhood of said resonance absorption frequency while the signal is impinging on said material and being sensed by said sensing means.

(References on following page)

References Cited

UNITED STATES PATENTS

| | | | |
|---|---|---|---|
| 1,978,021 | 10/1934 | Hollmann | 331—93 |
| 2,542,966 | 2/1951 | Randall et al. | 331—86 |
| 2,659,860 | 11/1953 | Breazeale | 324—58.5 |
| 2,794,959 | 6/1957 | Fox | 324—58 X |
| 2,798,197 | 7/1957 | Thurston | 324—58.5 |
| 2,867,778 | 1/1959 | Hafner | 333—97 X |
| 2,946,970 | 7/1960 | Hafner. | |
| 3,025,463 | 3/1962 | Luoma et al. | 324—58.5 |
| 3,166,720 | 1/1965 | Rosen et al. | 330—110 |
| 2,126,541 | 8/1938 | de Forest | 250—39 X |
| 2,792,548 | 5/1957 | Hershberger. | |
| 2,964,703 | 12/1960 | Sargent et al. | |
| 3,244,968 | 4/1966 | Nelson et al. | 324—0.5 |
| 3,265,967 | 8/1966 | Heald. | |
| 3,348,140 | 10/1967 | Godding. | |

OTHER REFERENCES

Proceedings of IEE, vol. 99, No. 57, January 1952, pp. 25–27.

EDWARD E. KUBASIEWICZ, Primary Examiner

U.S. Cl. X.R.

330—110; 333—95